(12) United States Patent
Rieger et al.

(10) Patent No.: US 6,736,874 B2
(45) Date of Patent: May 18, 2004

(54) FILTER DEVICE WITH CLAMPING WEDGE

(75) Inventors: Mario Rieger, Freiberg (DE); Matthias Amann, Remseck (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/305,388

(22) Filed: Nov. 27, 2002

(65) Prior Publication Data

US 2003/0121242 A1 Jul. 3, 2003

Related U.S. Application Data

(63) Continuation of application No. PCT/EP01/05386, filed on May 11, 2001.

(30) Foreign Application Priority Data

May 29, 2000 (DE) .......................... 100 26 437

(51) Int. Cl.⁷ .............................. B01D 46/00
(52) U.S. Cl. .................. 55/480; 55/385.3; 55/498; 55/502; 55/503; 55/510; 55/521; 55/528
(58) Field of Search ................ 55/385.3, 480, 55/498, 502, 503, 510, 522, 528, 521; 123/198 E

(56) References Cited

U.S. PATENT DOCUMENTS

| | | | | |
|---|---|---|---|---|
| 1,712,947 A | * | 5/1929 | Blair | 55/480 |
| 2,134,601 A | * | 10/1938 | Campbell | 55/480 |
| 2,962,121 A | * | 11/1960 | Wilber | 55/480 |
| 3,745,753 A | * | 7/1973 | Risse | 55/502 |
| 4,498,914 A | * | 2/1985 | Ericksen | 55/480 |
| 4,775,469 A | * | 10/1988 | Zimmerly | 55/508 |
| 4,822,386 A | * | 4/1989 | Duchesneau | 55/480 |
| 4,841,628 A | * | 6/1989 | Nagle | 29/723 |
| 5,030,264 A | | 7/1991 | Klotz et al. | 55/481 |
| 5,125,941 A | * | 6/1992 | Ernst et al. | 55/480 |
| 5,167,683 A | * | 12/1992 | Behrendt et al. | 55/498 |
| 6,051,042 A | * | 4/2000 | Coulonvaux | 55/498 |
| 6,299,661 B1 | * | 10/2001 | Bloomer | 55/498 |
| 6,436,162 B1 | * | 8/2002 | Wake et al. | 55/498 |

FOREIGN PATENT DOCUMENTS

| | | |
|---|---|---|
| DE | 3911153 A1 | 4/1989 |
| DE | 4031014 A1 | 10/1990 |

* cited by examiner

*Primary Examiner*—Duane Smith
*Assistant Examiner*—Jason M. Greene
(74) *Attorney, Agent, or Firm*—Crowell & Moring LLP

(57) ABSTRACT

A filter device, especially for filtering the intake air of an internal combustion engine, which includes a housing with an unfiltered air inlet and a clean air outlet, and a substantially cylindrical, replaceable filter insert disposed in the housing, which separates an unfiltered air zone within the housing from a clean air zone. An axial seal is provided on at least one end disk of the cylindrical filter insert, which seal interacts with a sealing surface on the housing to seal the unfiltered air zone from the clean air zone. A clamping wedge is also provided, which exerts a force on the filter insert to urge the axial seal reliably against the sealing surface of the filter housing.

8 Claims, 3 Drawing Sheets

FILTER DEVICE WITH CLAMPING WEDGE

CROSS REFERENCE TO RELATED APPLICATIONS

This application is a continuation of international patent application no. PCT/EP01/05386, filed May 11, 2001, designating the United States of America and published in German as WO 01/91884, the entire disclosure of which is incorporated herein by reference. Priority is claimed based on Federal Republic of Germany patent application no. DE 100 26 437,9, filed May 29, 2000.

BACKGROUND OF THE INVENTION

The invention relates to a filter device, particularly for filtering the intake air of an internal combustion engine, comprising a housing with an unfiltered air inlet and a clean air outlet, and a substantially cylindrical, replaceable filter insert disposed in the housing such that the filter insert separates the unfiltered air zone of the housing from the clean air zone. The filter insert has at least one end disk provided with an axial seal which interacts with a sealing surface of the housing to form a seal between the unfiltered air zone and the clean air zone.

This type of filter device is known in the art. Typically, the filter element is fastened in the filter device by a clamping bolt, for which fastening elements are provided on the housing. In these known filter elements, it is also possible to fix the filter element in the housing with a cover which is placed on the housing in the axial direction. If the substantially cylindrical filter element must be installed or removed under conditions where space is limited, pulling off or pulling up in axial direction may not be feasible. In these cases, the filter element must be lifted out of the housing, i.e., the housing is sealed with a lid that covers a portion of the lateral surface. After the cover has been opened, the filter element can be lifted out of the housing and a new filter element can be inserted.

One problem with this housing configuration is that axial displacement of the filter element is required to seal the unfiltered air side of the filter from the filtered air side. In prior art filter devices, this axial displacement has required special screwed connections or bayonet catches or special holding fixtures for the filter element.

SUMMARY OF THE INVENTION

Accordingly, it is an object of the invention to provide a filter device in which the filter element can easily be installed and removed under limited space conditions.

A further object of the invention is to provide a filter device which assures a simple, yet reliable seal between the unfiltered zone and the filtered air zone.

These and other objects are achieved in accordance with the present invention by providing a filter device comprising a housing with an unfiltered air inlet and a clean air outlet, and a substantially cylindrical, replaceable filter element arranged in the housing, said filter element separating an unfiltered air zone of the housing from a clean air zone, wherein at least one axial end face of the substantially cylindrical filter element is provided with an axial seal element which interacts with a sealing surface of the housing to form a seal between the unfiltered air zone and the clean air zone; said filter device further comprising a clamping wedge which applies a force to the filter element to urge the axial seal element reliably against the sealing surface of the housing.

In accordance with a further aspect of the invention, the object are achieved by providing a filter element for use in a filter device as described above, comprising an annulus of self-supporting, zigzag-folded filter paper or nonwoven filter material provided at axial end faces thereof with thermoplastic end disks, wherein at least one end disk is provided with at least one bracket or projection for engaging a clamping wedge for urging the filter element in an axial direction.

An important feature of the invention is that a clamping wedge is provided, the force of which is applied in such a way that the axial seal of the cylindrical filter element reliably fits against the sealing surface, which is a fixed part of the housing.

According to one embodiment of the invention, this clamping wedge is arranged on the cover. Closing the cover causes the filter element to be urged against the sealing surface, thus sealing the filter element. Opening the cover causes the filter element to be loosened, so that it is easy to remove.

Another embodiment of the invention provides that the clamping wedge can be inserted into a bracket of the filter element. To support the clamping wedge, a support surface or an additional element that is a fixed part of the housing is provided. The clamping wedge is at least partially wedge-shaped so that the force is readily transmitted when the cover is closed or the clamping wedge is inserted.

Another embodiment of the invention provides for an axial guide on the side of the filter element opposite the sealing surface, i.e., the filter element on this side is supported against the housing and is fixed so as to allow for axial tolerances.

One advantage of supporting the filter element in this manner is that the filter medium does not need to absorb any axial clamping forces. In addition, the filter housing itself can be made thinner since it is not tied into the force flux.

According to one embodiment of the invention, the filter element is comprised of a zigzag-folded filter paper or nonwoven filter material, which has a very high dust collection capacity paired with low flow resistance. The end disks of this filter element are made of a thermoplastic material. The filter element can thus be easily disposed of by incineration.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
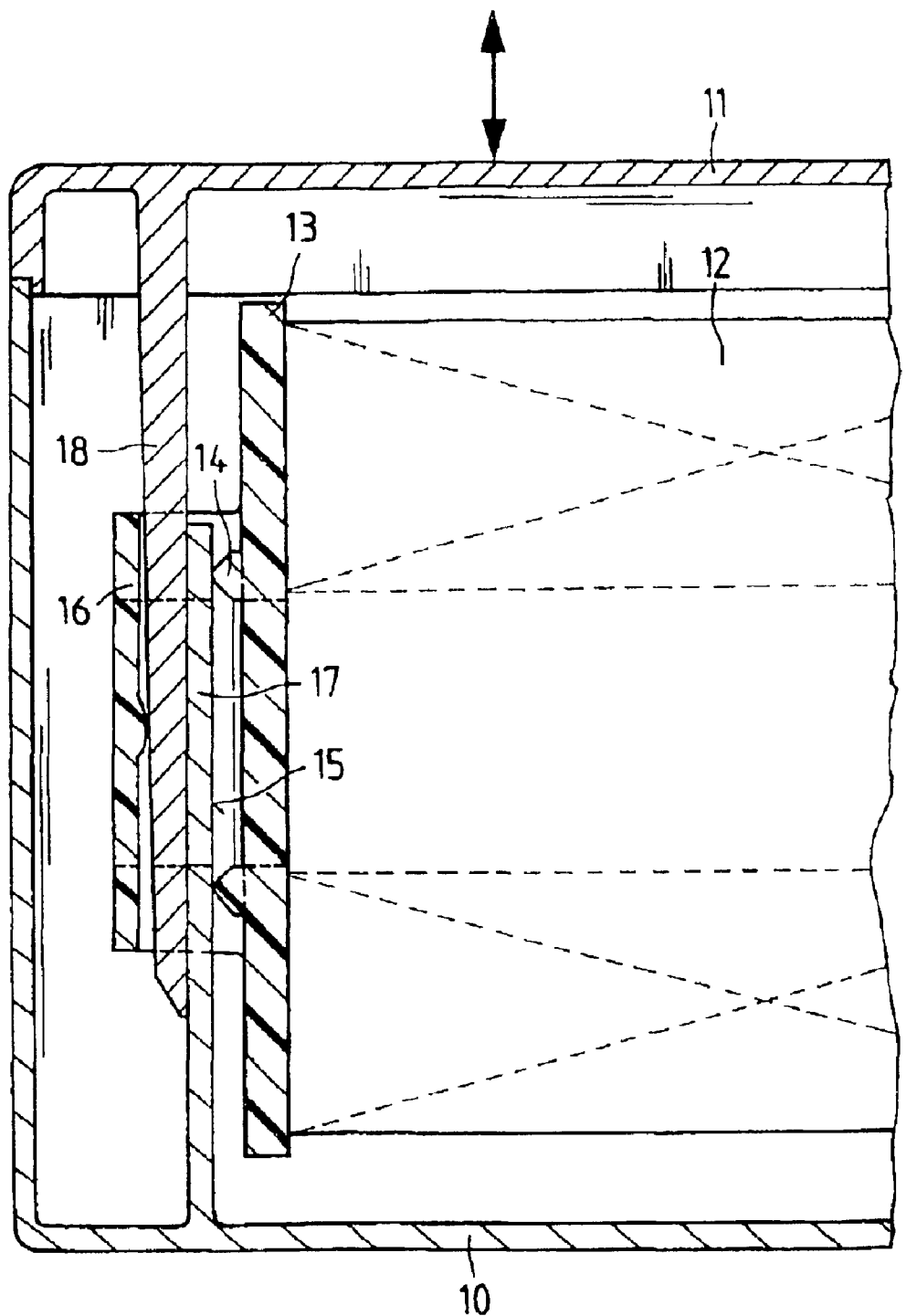
FIG. 1 is a schematic representation of a detail of the filter device of the present invention.

The schematic representation depicted in FIG. 1 shows a detail of a filter housing 10 and a housing cover 11. A filter element 12 is arranged inside the filter housing. This filter element is comprised of a zigzag-folded filter medium with an end disk 13. A sealing ring 14 is bonded or welded to end face 13. This sealing ring fits against a sealing surface 15 of filter housing 10. The sealing surface encloses the filtered air outlet (not shown). The end face is provided with a bracket type projection 16. A clamping wedge 18 is inserted between this bracket-type projection 16 and a support 17. This clamping wedge 18 is fixed to the housing cover and applies an axial force to filter element 12 such that a proper sealing effect is obtained between sealing ring 14 and sealing surface 15.

Figure 2:
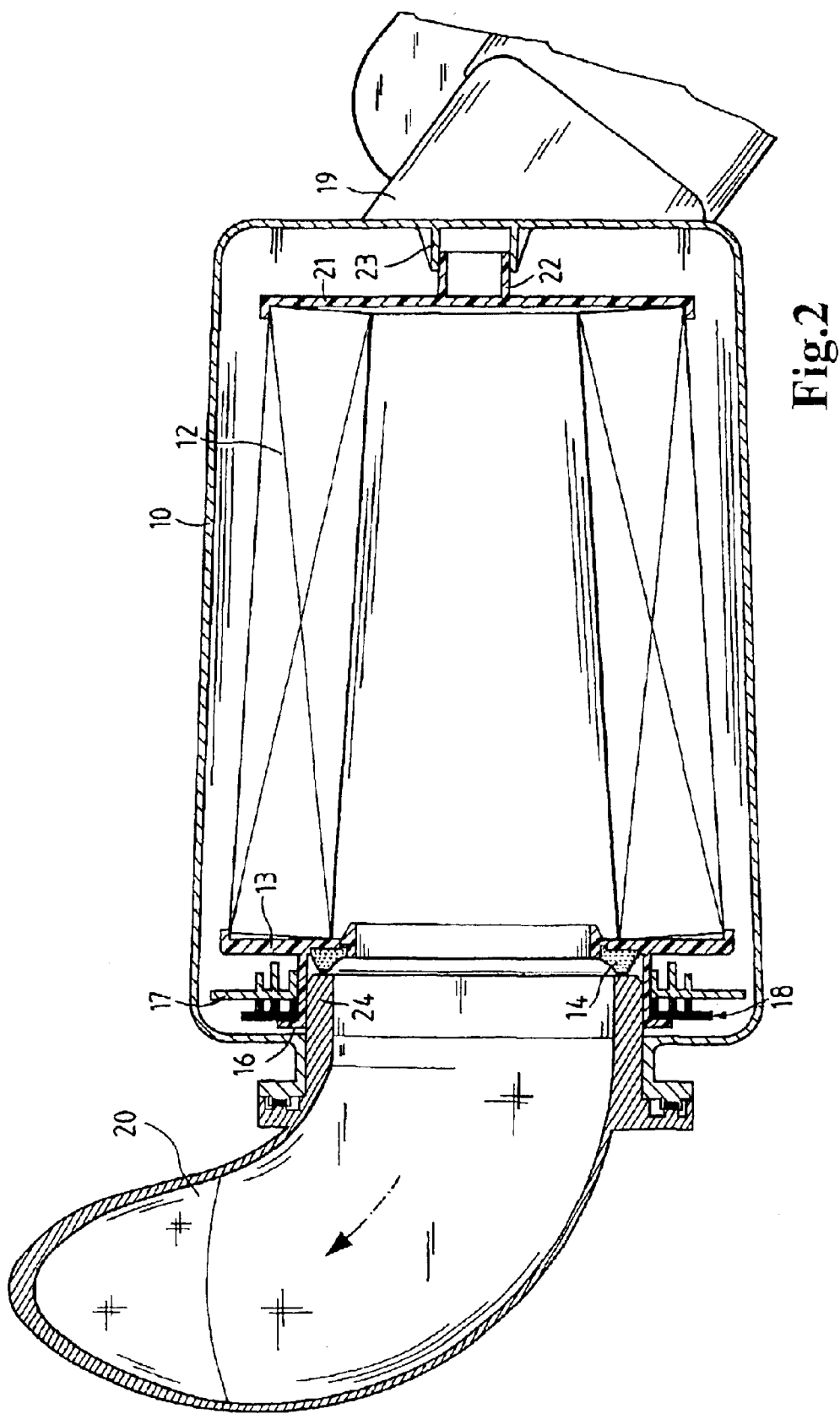
FIG. 2 is a cross-sectional view of a filter element according to the present invention.

FIG. 2 shows the entire structure of a filter device in a cross-sectional view (corresponding parts are identified by the same reference numerals). The unfiltered air inlet 19 is visible on the right hand side and the filtered air outlet 20 on the left hand side of the figure. The filter housing 10 is equipped with a filter element 12, which is provided with an end disk 21 at its right hand end. This end disk has a guide projection 22. The guide projection engages with a guide cylinder 23, which is fixed to the housing. This support enables radial displacement and good compensation of tolerances if the filter elements differ in length. The filter element is equipped with a second end disk 13 on the left hand side. This second end disk is provided with a projection 16 that extends across a filtered air connection 24 and ensures axial guidance of the filter element. Sealing ring 14 in this embodiment is made of polyurethane resin foam and is foamed onto the end disk 13. A support ring 17 is located on the housing. Between support 17 and projection 16, a clamping wedge 18 is inserted. This clamping wedge 18 pulls the entire filter element toward the left against the filtered air outlet connection 24 and thus establishes a reliable seal between the filtered air zone and the unfiltered air zone by urging seal ring 14 against the sealing surface at the neck of the filtered air outlet 24.

Figure 3:
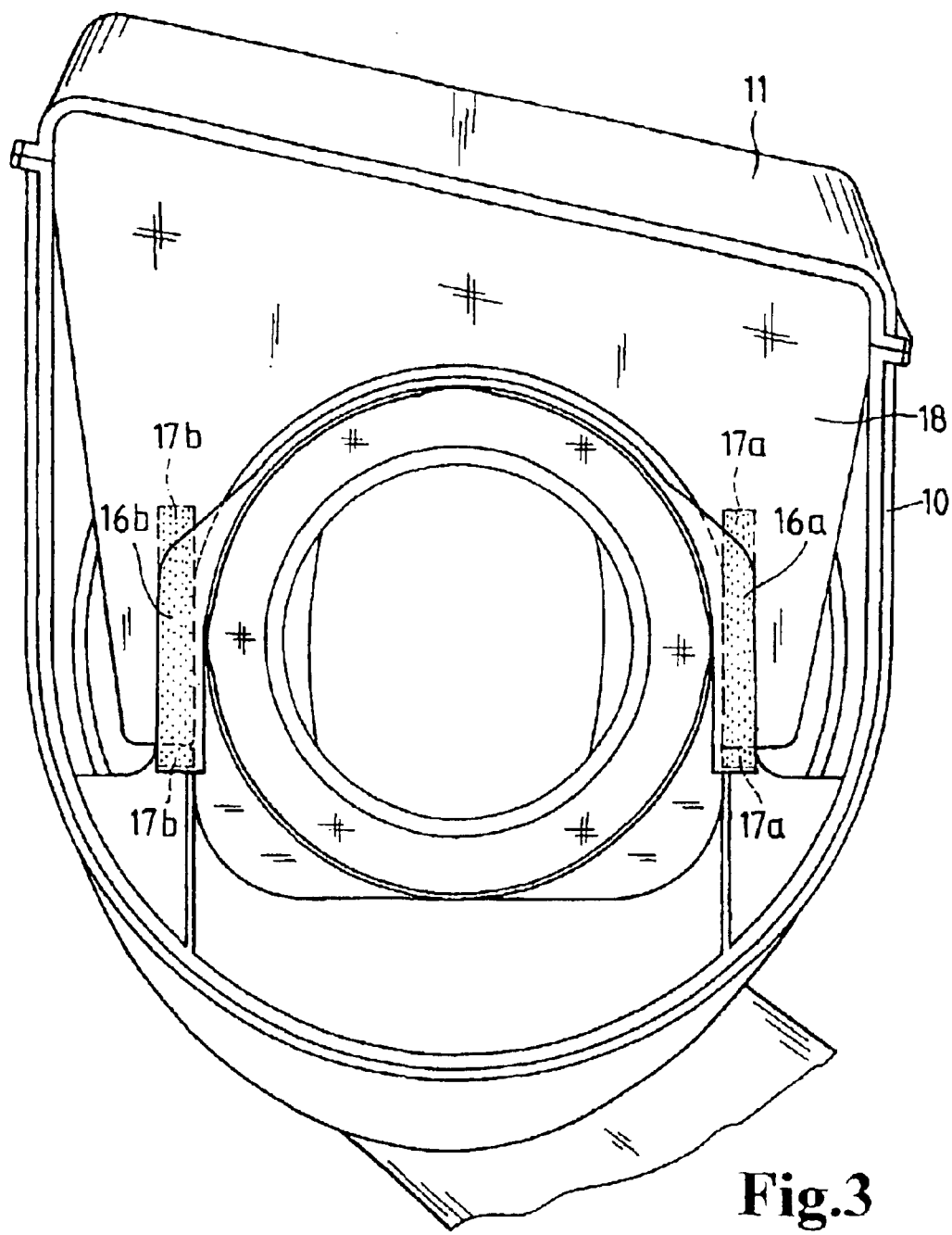
FIG. 3 is a top view of the filter element shown in FIG. 2.

FIG. 3 is a top view of clamping wedge 18, which is rigidly connected with housing cover 11. Projections 16a, 16b on the end disk 13 of the filter element partially surround or enclose the clamping wedge 18. Clamping wedge 18 is supported against supports 17a, 17b, such that the clamping forces for the end disks of the filter element can be applied over a predefined area. When housing cover 11 is removed, clamping wedge 18 is also pulled out. The filter element then can be readily removed from the filter housing and replaced with a new filter element.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A filter device comprising a housing with an unfiltered air inlet and a clean air outlet, and a substantially cylindrical, replaceable filter element arranged in the housing, said filter element separating an unfiltered air zone of the housing from a clean air zone, wherein at least one axial end face of the substantially cylindrical filter element is provided with an axial seal element which interacts with a sealing surface of the housing to form a seal between the unfiltered air zone and the clean air zone; said filter device further comprising a clamping wedge which applies a force to the filter element to urge the axial seal element reliably against the sealing surface of the housing, wherein the axial end faces of said filter element are formed by thermoplastic end disks, wherein an end disk of the filter element is provided with at least one bracket along which the clamping wedge slides, and wherein the clamping wedge is supported against a support fixed to the housing or against the sealing surface of the housing.

2. A filter device according to claim 1, wherein the clamping wedge is mounted on a cover for the housing and urges the sealing element against the sealing surface of the housing when the cover is closed.

3. A filter device comprising a housing with an unfiltered air inlet and a clean air outlet, and a substantially cylindrical, replaceable filter element arranged in the housing, said filter element separating an unfiltered air zone of the housing from a clean air zone, wherein at least one axial end face of the substantially cylindrical filter element is provided with an axial seal element which interacts with a sealing surface of the housing to form a seal between the unfiltered air zone and the clean air zone; said filter device further comprising a clamping wedge which applies a force to the filter element to urge the axial seal element reliably against the sealing surface of the housing, the filter device further comprising an axial guide at the opposite axial end face of said filter element from said seal element for axially guiding the filter element relative to the filter housing, wherein said axial guide comprises an axial projection on said filter element and a socket on said housing for receiving said axial projection.

4. A filter device according to claim 1, wherein the filter element is made of an annulus of a self-supporting, zigzag-folded filter medium provided at axial end faces thereof with thermoplastic end disks, and said axial seal element comprises a polyurethane foam seal affixed to an end disk of the filter element proximate the clean air outlet of the filter housing.

5. A filter element for use in a filter device according to claim 4, wherein the filter medium is a filter paper or a non-woven filter web.

6. A filter device according to claim 1, wherein said filter device is an air filter for intake air of an automotive internal combustion engine.

7. A filter element for use in a filter device comprising a housing with an unfiltered air inlet and a clean air outlet, and a substantially cylindrical, replaceable filter element arranged in the housing, said filter element separating an unfiltered air zone of the housing from a clean air zone, wherein at least one axial end face of the substantially cylindrical filter element is provided with an axial seal element which interacts with a sealing surface of the housing to form a seal between the unfiltered air zone and the clean air zone; said filter device further comprising a clamping wedge which applies a force to the filter element to urge the axial seal element reliably against the sealing surface of the housing, the filter element comprising an annulus of self-supporting, zigzag-folded filter paper or nonwoven filter material provided at axial end faces thereof with thermoplastic end disks, wherein at least one end disk is provided with at least one bracket for engaging a clamping wedge for urging the filter element in an axial direction.

8. A filter element according to claim 7, wherein an axial end face of said filter element is provided with an axial seal element for engaging a sealing surface of a housing to form a seal between an unfiltered air zone and a clean air zone.

\* \* \* \* \*